Oct. 12, 1948.　　　　　G. TREE　　　　　2,451,418
METHOD OF AND APPARATUS FOR REDUCING VISIBLE
VAPORS ABOVE OPEN VATS AND THE LIKE
Filed April 2, 1947
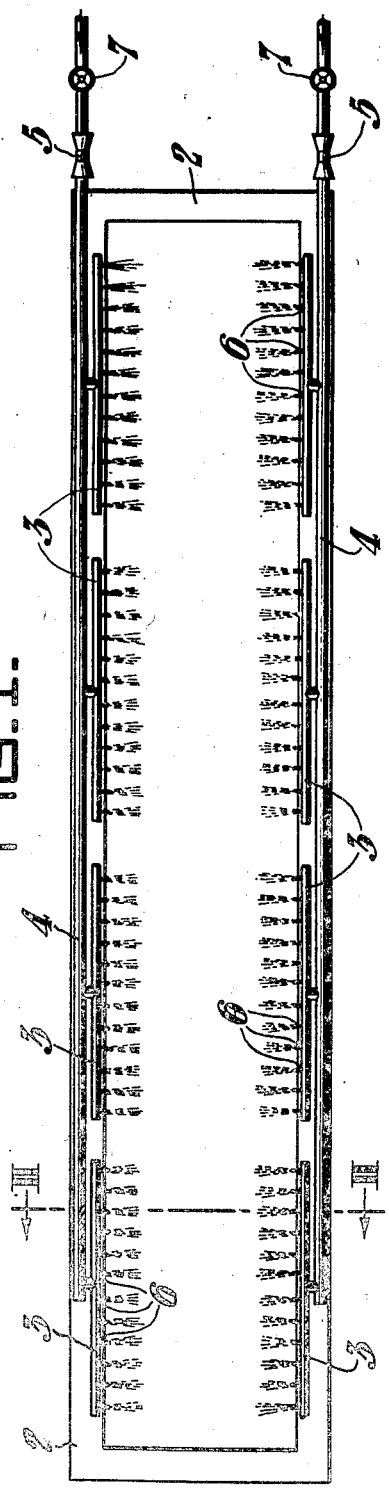
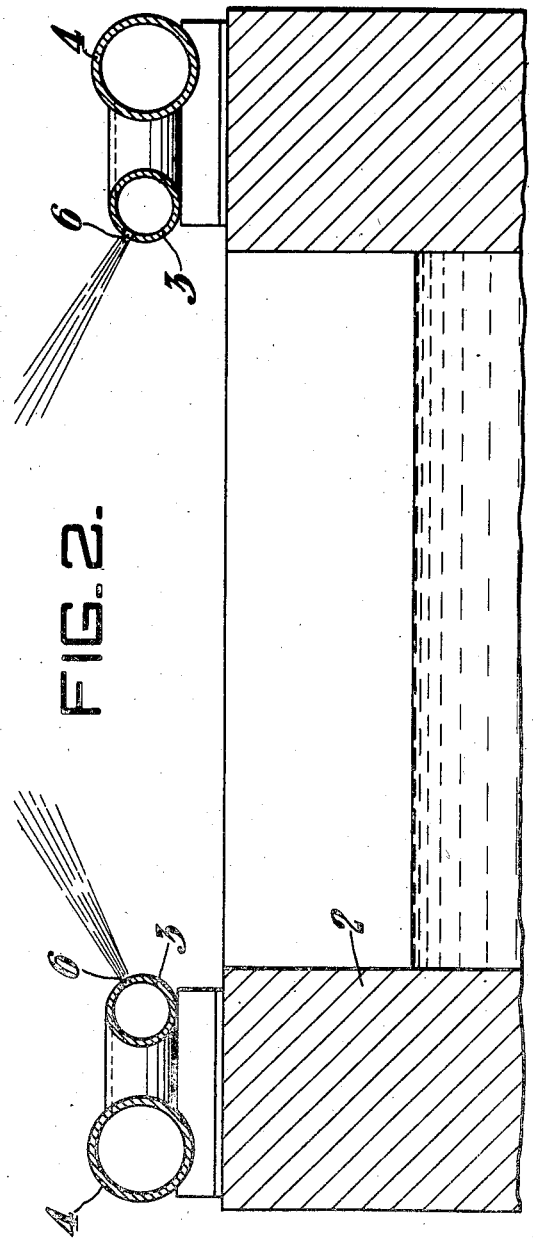
Inventor:
GEORGE TREE
by: Donald G. Dalton
his Attorney.

Patented Oct. 12, 1948

2,451,418

UNITED STATES PATENT OFFICE 2,451,418

METHOD OF AND APPARATUS FOR REDUCING VISIBLE VAPORS ABOVE OPEN VATS AND THE LIKE

George Tree, Gary, Ind., assignor to Carnegie-Illinois Steel Corporation, a corporation of New Jersey Application April 2, 1947, Serial No. 739,026

4 Claims. (Cl. 98—1)

This invention relates to improvements in the method of and apparatus for reducing visible vapors above open vats and the like.

In the practice of pickling steel in open acid vats or tanks, the vapors arising from the exposed surface of the acid bath interfere with visibility. Under such conditions, crane operators and others have difficulty in handling the material being pickled, resulting in a hazard to men and equipment. It is frequently necessary to heat the liquid in such vats, which increases vaporization, as does a decrease in the temperature of the surrounding atmosphere.

My invention has in view, the elimination of such a condition, by preventing the formation of visible vapors in the region above such vats and the like through the application of heat.

Additional objects and advantages will become apparent from the following description taken in connection with the accompanying drawing wherein:

Figure 1 is a top plan view of a pickling tank showing my invention; and

Figure 2 is an enlarged cross-section taken on the line II—II of Figure 1.

Referring to the drawings, 2 designates an open vat or tank of the type used in pickling steel in a contained bath of pickling solution, as for example, acid and water. Such tanks are frequently heated, by means not shown, in order to increase the pickling action of the solution.

In order to reduce or prevent the formation of visible vapors above such vats or tanks, I provide a source of heat above the surface of the contained aqueous liquid, as for example, by a series of burners 3 supplied by gas pipes 4 through mixer valve 5. As shown, the burners may be formed by drilling burner openings 6 along sections of pipe, and positioning such burners along the edges of the tank 2 with the openings 6 directed inwardly over the open top of the tank. Preferably, the openings 6 are also inclined upwardly to facilitate the updrift of the products of combustion when mixed with the vapors arising from the tank.

The burners may be regulated, as by fuel valves 7, to increase the temperature of the air above the liquid surface in the tank, so that the moisture content of the vapors arising from said liquid will be absorbed by the air in sufficient amount to render said vapors invisible. In other words, the moisture content of the vapors will thereby be prevented from condensation in fog-like form, which fog-like vapors obscure the tank and the operations being conducted therein.

The application of heat in the manner described also functions to lift the vapors high above the tank, thereby insuring an unobstructed view of the region immediately over said tank.

I have found that the foregoing method and apparatus may be easily controlled to maintain visibility under varying atmospheric conditions. My invention economically and efficiently provides visibility at low cost, compared with prior means, such as exhaust or ventilating systems.

Various changes and modifications are contemplated within the scope of the following claims.

I claim:

1. The herein described method of reducing visible vapors above open vats and the like containing aqueous liquids, consisting in heating the air above the level of said liquid adjacent the upper edges of the vat to a temperature preventing appreciable condensation of the moisture content of the vapors arising from said liquid.

2. Means for reducing visible vapors above open vats and the like, consisting in a series of heating burners disposed adjacent to and directed inwardly over said vat.

3. Means for reducing visible vapors above open vats and the like, consisting in a series of heating burners disposed adjacent the upper edges of the vat, said burners having burner openings directly inwardly over said vat.

4. Means for reducing visible vapors above open vats and the like, consisting in a series of heating burners disposed adjacent the upper edges of the vat, said burners having burner openings directed inwardly and inclined upwardly over said vat.

GEORGE TREE.

REFERENCES CITED

The following references are of record in the file of this patent:

UNITED STATES PATENTS

| Number | Name | Date |
|---|---|---|
| 862,981 | Lorimer | Aug. 13, 1907 |
| 1,225,521 | Steinmetz | May 8, 1917 |
| 1,505,914 | Witteborg | Aug. 19, 1924 |
| 1,539,973 | Truxal | June 2, 1925 |
| 1,577,509 | Witham, Jr. | Mar. 23, 1926 |
| 2,426,822 | Fonos | Sept. 2, 1947 |